(12) United States Patent
Campbell et al.

(10) Patent No.: US 10,612,716 B1
(45) Date of Patent: Apr. 7, 2020

(54) FLEXIBLE COMPOSITE DUCT FOR THE TRANSPORT OF CRYOGENIC FUELS AND OXIDIZERS

(71) Applicant: United Launch Alliance, L.L.C., Centennial, CO (US)

(72) Inventors: Connor W. Campbell, Englewood, CO (US); Guy Brendan Kayne, Castle Rock, CO (US); James A. Krajnak, Black Diamond, WA (US)

(73) Assignee: United Launch Alliance, L.L.C., Centennial, CO (US)

( * ) Notice: Subject to any disclaimer, the term of this patent is extended or adjusted under 35 U.S.C. 154(b) by 326 days.

(21) Appl. No.: 15/843,117

(22) Filed: Dec. 15, 2017

Related U.S. Application Data

(60) Provisional application No. 62/434,918, filed on Dec. 15, 2016.

(51) Int. Cl.
*F16L 59/14* (2006.01)
*F16L 59/153* (2006.01)

(52) U.S. Cl.
CPC ........... *F16L 59/141* (2013.01); *F16L 59/153* (2013.01)

(58) Field of Classification Search
CPC .............................. F16L 59/141; F16L 59/153
USPC ................ 138/134, 128, 151, 156, 170, 137
See application file for complete search history.

(56) References Cited

U.S. PATENT DOCUMENTS

| | | | |
|---|---|---|---|
| 3,911,962 A | 10/1975 | Chomat et al. | |
| 4,445,543 A | 5/1984 | Mead | |
| 4,492,089 A | 1/1985 | Rohner et al. | |
| 4,570,678 A | 2/1986 | Ziemek et al. | |
| 4,759,388 A * | 7/1988 | Kiyama | F16L 11/082 138/126 |
| 5,264,262 A * | 11/1993 | Igarashi | B60H 1/00571 138/125 |
| 5,679,425 A * | 10/1997 | Plumley | B32B 1/08 428/35.7 |
| 5,778,940 A * | 7/1998 | Tucker | F16L 11/115 138/121 |
| 6,003,561 A | 12/1999 | Brindza et al. | |
| 6,035,899 A * | 3/2000 | Ohkoshi | F16L 11/08 138/123 |
| 6,186,181 B1 | 2/2001 | Schippl | |
| 6,240,971 B1 * | 6/2001 | Monette | F16L 9/147 138/134 |
| 6,948,527 B2 | 9/2005 | Ragner et al. | |
| 8,074,686 B2 * | 12/2011 | Wolfram | B65G 53/32 138/109 |
| 8,789,562 B2 | 7/2014 | Kagoura | |
| 9,127,792 B2 | 9/2015 | Biaggi et al. | |

(Continued)

FOREIGN PATENT DOCUMENTS

| | | |
|---|---|---|
| WO | WO 2007/055583 | 5/2007 |
| WO | WO 2014/001429 | 1/2014 |

*Primary Examiner* — Craig M Schneider
*Assistant Examiner* — David R Deal
(74) *Attorney, Agent, or Firm* — Sheridan Ross P.C.

(57) ABSTRACT

A multi-ply composite duct comprised of polymeric materials, inter-ply cryogenic epoxy or sealing agent, and structural reinforcement material and methods of making the duct are disclosed. Ducts according to the present disclosure demonstrate the ability to satisfy performance requirements for transfer of single and multiphase fluids at cryogenic temperatures, and resist perforation, occlusion, combustion and galvanic coupling.

21 Claims, 5 Drawing Sheets

(56) References Cited

U.S. PATENT DOCUMENTS

| | | |
|---|---|---|
| 9,441,766 B2 | 9/2016 | Witz et al. |
| 2003/0172981 A1 | 9/2003 | Gibson |
| 2007/0209729 A1 | 9/2007 | Tomerlin et al. |
| 2007/0235100 A1 | 10/2007 | Tomerlin et al. |
| 2010/0300570 A1* | 12/2010 | Witz ........................ F16L 9/12 138/137 |
| 2011/0226375 A1* | 9/2011 | Harris ...................... B32B 1/08 138/137 |
| 2012/0012221 A1 | 1/2012 | Queau et al. |
| 2013/0014849 A1* | 1/2013 | Glejbol ................. F16L 11/083 138/137 |
| 2013/0025733 A1* | 1/2013 | Yamakawa ............... B32B 1/08 138/137 |
| 2013/0105026 A1 | 5/2013 | Biaggi et al. |
| 2014/0076451 A1* | 3/2014 | Felix-Henry ......... F16L 11/083 138/129 |
| 2015/0000781 A1* | 1/2015 | Oishi ................... B29C 48/151 138/138 |

\* cited by examiner

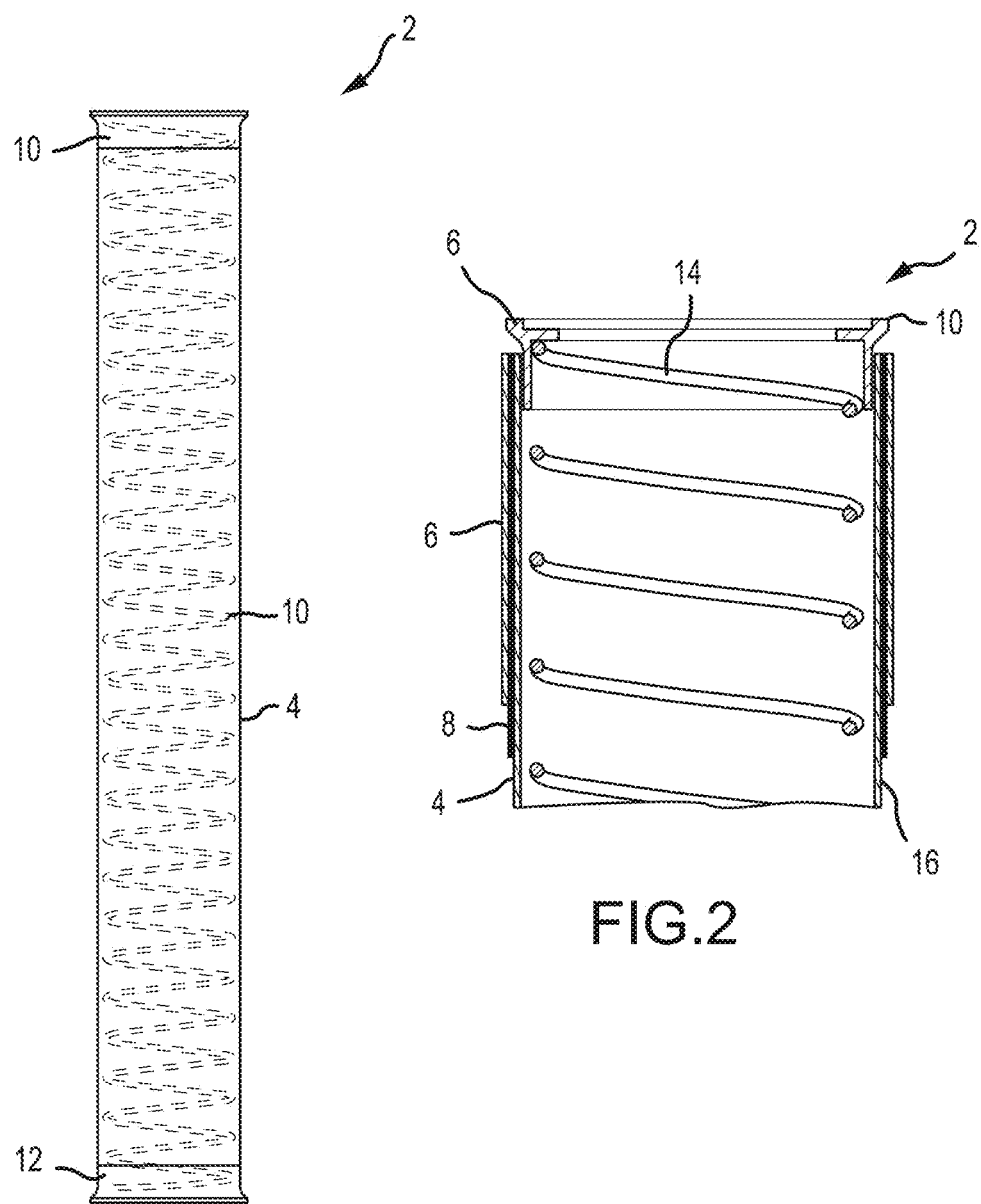

FLEXIBLE COMPOSITE DUCT FOR THE TRANSPORT OF CRYOGENIC FUELS AND OXIDIZERS

CROSS-REFERENCE TO RELATED APPLICATIONS

This application claims the benefit of U.S. Provisional Patent Application Ser. No. 62/434,918, filed Dec. 15, 2016, the entirety of which is incorporated herein by reference.

FIELD OF THE INVENTION

Embodiments of the present invention generally relate to composite ducts capable of handling fluids at a wide range of temperatures, including cryogenic temperatures, and more specifically, to composite ducts used with cryogenic propellants in the dynamic environment of a launch vehicle.

BACKGROUND OF THE INVENTION

Launch and Space vehicle systems utilize propellants maintained at cryogenic temperatures. Cryogenic temperatures include as low as −452 degrees Fahrenheit. As one example, liquid hydrogen and liquid oxygen are stored in separate propellant tanks and combined at the inlet of an engine prior to combustion. Not only must the propellants be stored and maintained at extremely cold temperatures, but to supply the engine(s) with liquid fuel and oxidizers or other propellant requires transferring the extremely cold propellant from the storage tanks to the engine(s). Also, as the temperature of extremely cold liquid propellants warms, the propellant undergoes a phase change and the liquid propellant transitions into a gas phase. Such warming occurs not only on the launch pad from ambient conditions, but in space from exposure to solar energy striking the launch vehicle. Such heating is absorbed by the propellants as the latent heat of vaporization with little to no change in sensible heat, meaning after fully converted to a gas, the propellant is still at the same cryogenic temperature. The management and conveyance of cryogenic gasses is equally important to launch and space vehicle systems as cryogenic fluids. As an example, the introduction of additional heat to a cryogenic gas in a closed system increases the pressure in the storage tanks, requiring venting of at least a portion of the gas to maintain desired pressures and temperatures within the tank. Similar to fuel supply lines, ducts for transporting and venting the gas must be able to withstand cryogenic temperatures.

Cryogenic temperatures are problematic for non-metallic materials because of the resulting poor properties, making most non-metallic materials weak and brittle. For this reason, metallic materials are used for transporting liquid and gas phase propellants at these cold temperatures. Metallic ducts have excellent properties at cryogenic temperatures and therefore exhibit excellent mechanical performance. However metallic solutions tend to be massive or require massive support systems in order to survive significant loading environments. The higher mass when combined with high vibration and other loads arising from launch and space vehicle environments can further result in high loads transferred to adjacent structures leading to damage or failure. Adjacent structures can include sensitive structural or payload elements, which can drive the need for additional supports or similar mitigations resulting in even more total system mass. To address the issues of escalating mass and resulting loads to interfacing hardware, metallic ducts of increasing complexity and cost have been designed to control mass on interface load escalation. For example, incorporating metallic bellows with various mechanical restraints has been utilized extensively reducing vibration response and load transfer. However bellows type solutions present new challenges such as squirm, bulging and fatigue induced by high vibration and load environments. Again, this leads to increasingly complex designs with increased expense and do not reduce weight in an appreciable or meaningful way and in some instances increase weight. Metallic ducts can present additional challenges such as galvanic corrosion and combustion when transporting pressurized oxygen. These and similar issues further result in more complex designs which increase expense and do not reduce weight in an appreciable or meaningful way.

WIPO Publication WO 2014/001429 ("the '429 publication") describes flexible hose for carrying cryogenic fluid, specifically for transferring liquid natural gas from an offshore tanker to an on-shore storage facility. More specifically, a hose is disclosed having an inner polymer wall surrounded by a corrugated metal duct with a coiled wire support wound through the corrugations, an outer fabric layer and a second wire support frame wound around the exterior of the fabric. The corrugated metal portion adds weight. The metals forming the duct and coil could cause galvanic corrosion. Moreover, the fabric layer, at a minimum, is a significant fire hazard. If the duct or hose contains pressurized cryogenic oxygen, an impact or puncture of duct or hose can result in combustion and explosion and the presence of the fabric layers facilitate and enhance this risk.

U.S. Pat. No. 4,445,543 ("the '543 patent") also discloses a flexible hose for loading and offloading liquefied gases from tanker ships. The hose is made of multiple polypropylene film tubular bodies alternating with tubular bodies of polyethylene terephthalate cloth, an innermost and outermost wear resistant layer of polyethylene terephthalate cloth, and wires helically wound on the inside and outside of the bodies. Again, the cloth layers make this hose a significant combustion risk. Moreover, while the patent states the hose will remain flexible at temperatures down to −196 degrees Centigrade (approximately −320 degrees Fahrenheit), it does not teach or suggest the ability to handle cryogenic liquids below −320 degrees Fahrenheit.

Further still, hoses of the type described in the '429 publication and '543 patent present a further risk of perforation and/or occlusion. The annulus of space among and between the various layers existent in each of these hoses may fill with gas or liquid in the event of a failure or puncture of the inner fluid barrier layer. Gas or liquid would accumulate and could occlude the hose, preventing or reducing to inadequate levels any further propellant flow. Fluid accumulation in this interstitial gap also may rupture the hose, particularly as the ambient pressure decreases during vehicle ascent or approaches zero in the space environment. Fluid trapped in this gap may rupture an interior layer of the duct, or expand to occlude the flow path. The insulation space and fabric layers allow for the accumulation of gas and/or liquid and for the potential liquefaction of air if the space is not completely purged. As a result, these hoses would not have applicability at temperatures below approximately −300 degrees Fahrenheit because at temperatures below −300 degrees, the air would condense.

Another concern with launch vehicle/spacecraft applications is the sensitivity of the payload and surrounding composite vehicle structures. In addition to damage resulting from vibrations or load transfer, payloads and composite structures can be damaged by outgas emanating from polymers and epoxies. NASA has specified outgassing requirements for systems physically located in the same enclosure as composite vehicle structures or payloads.

Both the '429 application and '543 patent were clearly developed and intended for ground based industrial applications where mass is not important and survivability in high vibration and load environments are not a factor. This observation, in addition to the afore described specific failure scenarios, do not allow for these designs or any practical variants to be used for launch or space system applications.

SUMMARY OF THE INVENTION

The present disclosure solves the foregoing problems. According to aspects of the present disclosure, multi-ply composite duct comprised of polymeric materials, inter-ply cryogenic epoxy or sealing agent, and structural reinforcement material demonstrates the ability to satisfy performance requirements for transfer of single and multiphase fluids at cryogenic temperatures as low as −452 degrees Fahrenheit and as high as +200 degrees Fahrenheit. Embodiments made according to the present disclosure offer a high performance, low cost, low weight alternative to all metallic cryogenic ducting. Cryogenic ducting must have strength, resilience, and flexibility at these conditions. For example, in some applications, the duct must withstand substantial vibration arising from different inputs as well as inhibit the transfer of such vibrations to surrounding vehicle structures. The duct must also minimize out-gassing in environments where sensitive equipment and/or composite vehicle structures are present and must be compatible with a wide range of fuels and oxidizers within this temperature range. For launch vehicle and spacecraft applications, mass and the resulting interface loads are critical to vehicle performance.

According to aspects of the present disclosure, in one embodiment, the invention is a composite construction comprised of multiple layers or plies of polymer film with an inter-ply cryogenic epoxy or adhesive agent that significantly increases the strength of the duct while maintaining flexibility. The epoxy used in the construction of the duct is an aerospace grade adhesive used in applications in which low out-gassing is a requirement. An integral structural plastic, polymer, or metallic wire reinforces the duct while preventing duct occlusion or collapse in the event of delamination or puncture of the inner plies and enhancing three-dimensional shape memory by contributing to the return of the duct to its original shape following vibration and/or torsion events. The wire may take the form of a coil, individual rings, or a combination of both. Additional reinforcement may be added to the ends of the duct to minimize point loading and stress concentrations induced at the system interface. In all of these iterations, the result is a robust design tolerant of mechanical environments and damage.

According to aspects of the present disclosure, in one embodiment the duct may comprise two layers of polymer film with an inner layer of epoxy. It may also comprise up to ten layers of polymer with inner epoxy layers between each polymer layer. The epoxy bonds the adjacent polymer layers continuously along the length of the duct. The continuous bond of adjacent polymer surfaces resists occlusion, perforation and collapse. Adhesive bonding along the axial length of the duct joining adjacent polymer surfaces acts as a reinforcement and fluid barrier. The bonded structure of the invention also prevents inclusions of gas and liquid from accumulating if a layer is punctured, and mitigates the risk of occlusion of the duct if flow is allowed to enter the interstitial space between layers. The absence of gaps and/or spaces between layers prevents occlusion arising from trapped gases or liquids, particularly as a result of significant pressure changes that arise during vehicle ascent or in the space environment. The bonded multi-ply construction also reduces or mitigates the propagation of cracks that may form in the duct wall.

Also, ducts made according to aspects of the present disclosure mitigate combustion due to impact and perforation occurring in an oxygen rich environment, such as when working with liquid oxygen and liquid hydrogen. Tests for material acceptability have been successfully passed per the ASTM D433 test method. Often, prior art designs utilize incompatible materials such as rubber coated film, polyethylene terephthalate (PET), polyethylene and polyamide which have demonstrated sensitivities to impact ignition in oxygen. In a launch vehicle and spacecraft application, wear or damage from vibration and other loads is a legitimate risk. A duct that is both flexible and resilient can absorb and dampen loading without puncture or damage. Additionally, multi-ply composite ducts according to the present disclosure are tough enough to resist damage or at least full puncture even if subjected to impact.

Ducts made according to aspects of the present disclosure also satisfy NASA outgassing requirements (ASTM E595) for systems in the same enclosure as payloads or vulnerable composite structures. More specifically, polymers and epoxies can outgas chemicals that can harm sensitive payloads and deteriorate composite vehicle structures. Propellants can similarly outgas harmful chemicals. In some embodiments of the present disclosure, the polymer layers comprise Kapton or FEP which satisfy NASA's outgassing requirements and also satisfy outgassing requirements for propellants including hydrogen and oxygen. Ducts made according to aspects of the present disclosure have total mass losses (emissions) between 1.0% and 0.1% collected volatile condensable materials.

Furthermore, according to aspects of the present disclosure, the possibility of a galvanic couple forming between metallic elements is eliminated which precludes the occurrence of galvanic corrosion. The ducts are also capable of being made with metallicized film, which in addition to the internal spring in one embodiment, provides a grounding path for electric current between the end fittings.

Another structural distinction according to aspects of the present disclosure is the usage of an internal coiled wire and/or rings to provide form and resiliency to the duct while minimizing the transmission of loads. The internal coiled wire is passively captured at its ends, rather than bonded or welded to the duct, allowing the structure of the duct to freely move when subjected to launch vehicle vibration while distributing loads to the end fittings. A duct with cable reinforcement or a spring bonded to its pressure barrier would be unable to do this without risking failure of the pressure barrier. The internal reinforcement aids in the prevention of occlusion or collapse in the event of perforation, puncture, or crushing of the duct, whereas an interstitial or external reinforcement relies on adherence to prevent collapse. Alternatively, the wire and/or rings may be located on the outside of the duct. The wire provides grounding of the duct and a continuous electrical path between end fittings. A duct made according to the present disclosure has a smooth or nominally smooth inner bore that enhances fluid flow without generating turbulence or non-laminar flow which can adversely affect flow performance.

According to aspects of the present disclosure, ducts of the present disclosure may be made from sheets of polymer wound around a mandrel having a single longitudinal seam extending co-axially with the length of the duct. An adhesive or epoxy layer is positioned between each adjacent polymer layer such that the outer surface of the inner polymer sheet is continuously bonded to the inner surface of the outer polymer sheet. In one embodiment, sheets of polymer film are wound around a mandrel. A layer of epoxy is applied between each polymer layer. For each polymer layer, a single seam is formed that extends coaxially along the length of the duct. The seams of adjacent layers may be aligned or, preferably, offset from each other. The opposing edges of a layer may be adhered along their edges, or overlapped, typically but not exclusively 0.5-1.0 inches. The process may be carried out manually or by an automated process. In one embodiment of an automated process, a conveyor may convey individual polymer layers to a mandrel. A roller presses the polymer layer against the mandrel. A vacuum may be applied by the mandrel to secure the polymer layer against the surface of the mandrel. Epoxy may then be applied to the outer surface of the polymer layer secured to the mandrel. The epoxy may be applied by an application roller or by a spray device. The epoxy is applied in a continuous layer with a predetermined thickness. Delivery of the individual layers may be spaced apart, from a timing perspective, such that the next polymer layer is delivered to the mandrel after the prior polymer layer has been received, secured and epoxy applied. The nip or pressure roller then presses the incoming polymer sheet against the epoxy applied to the previous polymer sheet thereby creating a complete joining of the adjacent polymer surfaces and removing any air pockets. Different thicknesses of polymer sheets are accommodated, as are different epoxies and different epoxy thicknesses. The equipment is sized to output single ducts with varying lengths. Additional polymer layers and inter-epoxy layers are added in the same manner.

The thickness of the epoxy layers is important. If the epoxy layers are too thick, the finished duct will be more rigid and less flexible. If the epoxy is too thin, the resulting duct will not withstand pressures as needed. In general, each epoxy layer preferably has a uniform and even thickness of between 0.001 and 0.005 inches or alternatively, a density between 0.001 lbm/ft$^2$ and 0.002 lbm/ft$^2$, more preferably between 0.0012 and 0.00195 lbm/ft$^2$ and most preferably between 0.00135 and 0.00187 lbm/ft$^2$. Strength of the epoxy layer is stronger for a smoothly applied layer compared to a roughly applied layer. For example, use of a squeegee to achieve a smooth epoxy surface and uniform thickness yields a stronger layer than an epoxy applied with a roller or spray applicator. It should be further appreciated that as additional polymer layers are added, the thickness of the epoxy layers can decrease. Alternatively, the thickness of the individual layers may vary from one layer to the next, for example, each layer gradually decreasing or increasing in thickness from the innermost epoxy layer to the outermost epoxy layer.

According to aspects of the present disclosure, the polymeric-composite cryogenic vent ducts are more flexible compared to metallic flexible ducts, have a demonstrated compatibility with oxygen, hydrogen, helium, rocket propellant (RP) and jet propellant (JP) series kerosene fuels, methane and nitrogen, do not exhibit out-gassing, are an order of magnitude lower in mass per unit length compared to metallic ducting, have low acceleration induced end loads due to relatively low mass, and are an order of magnitude lower in cost per unit length compared to metallic ducting.

According to aspects of the present disclosure, a duct having 2 polymer plies or layers and an inner ply of epoxy can react between 16 ksi to 44 ksi hoop stress at temperatures ranging from −420 degrees Fahrenheit to +70 degrees Fahrenheit. It should be appreciated that strength of the duct varies depending upon the ply material and thickness and the epoxy thickness and application method. Each additional layer of epoxy and polymer added increases the strength of the duct by between 8 ksi to 22 ksi. The specific strength of the duct generally increases as temperature drops making ducts made according to the present disclosure ideally suited for cryogenic propellants. The maximum specific strength of a duct made according to the present disclosure varies from approximately 100 kip*in/lbm at ambient temperature to approximately 150 kip*in/lbm at −320 degrees Fahrenheit.

According to aspects of the present disclosure, in one embodiment, a duct for transporting cryogenic fluids is provided comprising a first polymer tubular member defining a first open end and an opposing second open end with a single seam extending between the first end and the second end and oriented substantially parallel to the longitudinal axis of the first polymer tubular member. The first polymer tubular member has an inner surface and an outer surface and a thickness between approximately 0.0005 and 0.01 inches, and more preferably between 0.001 and 0.007 inches. A first epoxy layer covers the entirety of the outer surface of the first tubular member. In one embodiment, the first epoxy layer has a first constituent component and a second constituent component, although epoxies with three or more constituent parts may be used. A second polymer tubular member defining a first open end and a second open end with a single seam extending between the first end and the second end and oriented substantially parallel to the longitudinal axis of the first tubular member is disposed around the first epoxy layer. The second polymer tubular member has an inner surface and an outer surface and a thickness between approximately 0.0005 and 0.01 inches and more preferably between 0.001 and 0.007 inches. The second polymer tubular member covers the first epoxy layer such that a continuous bond is formed between the inner surface of the second polymer tubular member and the first epoxy layer with the first open end of the second polymer tubular member aligned with the first open end of the first polymer tubular member to define a first common open end and the second open end of the second polymer tubular member aligned with the second open end of the first polymer tubular member to define a second common open end. A first annular fitting is interconnected to the first common open end the combined first and second polymer tubular members and a second annular fitting interconnected to the second common open end of the combined polymer tubular members. A coiled wire is provided with a first end in contact with the first annular fitting and a second end in contact with the second annular fitting.

In another embodiment, at least one additional epoxy layer and polymer layer are added to the embodiment described in the prior paragraph. A second epoxy layer covers the entirety of the outer surface of the second tubular member. A third polymer tubular member defining a first open end and a second open end with a single seam extending between the first end and the second end and oriented substantially parallel to the longitudinal axis of the first tubular member, the third polymer tubular member having an inner surface and an outer surface and a thickness between approximately 0.0005 and 0.01 inches and more preferably between 0.001 and 0.007 inches, and the third polymer tubular member covering the second epoxy layer such that a continuous bond is formed between the inner surface of the third polymer tubular member and the second epoxy layer with the first open end of the third polymer tubular member aligned with the first open end of the first and second polymer tubular members to define a first common open end and the second open end of the third polymer tubular member aligned with the second open end of the first and second polymer tubular members to define a second common open end.

In yet another embodiment, a cryogenic composite duct comprises a first polymer sheet having a first edge and a second edge joined to form a tubular shape with the first and second edges forming a longitudinal seam oriented substantially parallel to an axis of the tubular shape. A first epoxy layer is applied on an outer surface of the first polymer sheet, the first epoxy layer having a first component and a second component. A second polymer sheet is applied on the first epoxy layer such that the second polymer sheet forms a continuous bond with the first epoxy layer and the first polymer sheet to form combined polymer sheets having a tubular shape with a first opening and an opposing second opening. A first fitting is interconnected to the first opening of the combined polymer sheets and a second fitting is interconnected to the second opening of the combined polymer sheets. A spring is positioned within the combined polymer sheets between the first fitting and the second fitting, wherein the spring has an uncompressed length that is larger than a length of the combined polymer sheets such that the spring is configured to contact the first fitting and the second fitting.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about." It should also be appreciated that the term "above" as used to describe the relative location of the two tanks is intended to include not just a vertical alignment. Following launch, the position of the launch vehicle may no longer remain vertical but may have other orientations. Here, the relative position of the two tanks is linear or axially aligned.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, explain the principles of the invention.

FIG. 1 is an elevation of one embodiment of a multi-ply polymeric duct according to aspects of the present disclosure.

FIG. 2 is a partial exploded view of the embodiment of FIG. 1.

In certain instances, details that are not necessary for an understanding of the disclosure or that render other details difficult to perceive may have been omitted from the drawings. It should also be understood that in some instances, details may have been added, such as details relating to methods of construction, including for example construction lines and dimensions, to assist in explaining the methods and structures of the preferred embodiments described herein. It should be understood, of course, that the claimed invention is not necessarily limited to the particular embodiments illustrated herein.

DETAILED DESCRIPTION

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 3:
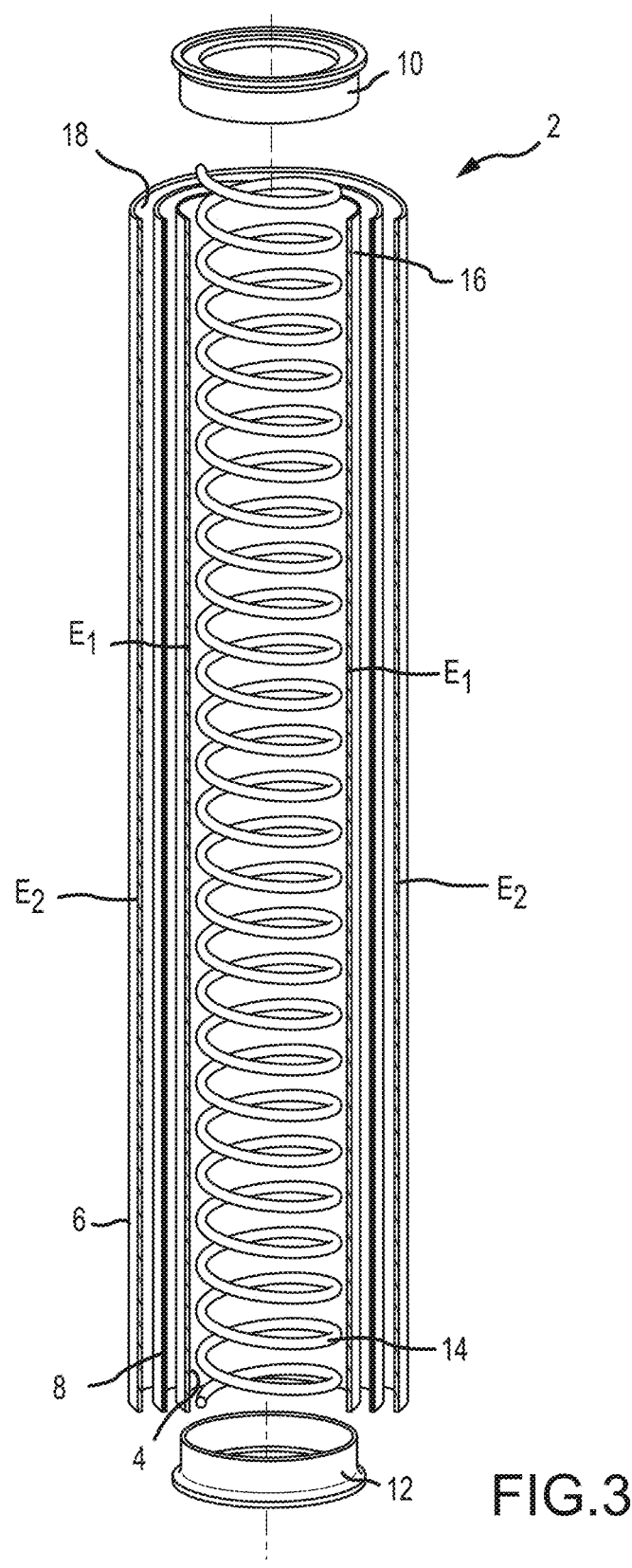
FIG. 3 is an enlarged cross-section view of one end of the embodiment of FIG. 1.

Turning to FIGS. 1-3, a first embodiment of a multi-ply polymeric duct 2 according to aspects of the invention is disclosed. As illustrated, the duct comprises a first innermost polymeric sheet 4, a second outermost polymeric sheet 6, an epoxy layer 8 between the polymer layers, first and second end fittings 10 and 12, and a coiled wire 14 extending from the first fitting to the second fitting. To limit the negative effects resulting from gaps or spaces formed between layers, it is important that the epoxy layer be applied completely and fully cover the outer surface 16 of the inner sheet 4 and that the inner surface 18 of the outer sheet 6 fully contact the epoxy layer 8. The fittings 10 and 12 are metal and connect the duct 2 or other structures. A coiled wire 20 is positioned inside the duct 2 and extends from the first end fitting 10 to the second end fitting 12. The wire provides structural rigidity to the duct 2 and electrical conductivity. Preferably, the ends of the wire are not affixed to the fittings and accommodate movement of the duct 2 relative to the fittings. The wire is of a sufficient length and shape to be installed in a compressed state where the ends press against the fittings. The wire may alternatively be a conductive plastic, a non-conductive plastic, individual rings spaced along the axial length of the duct, or a combination of these.

Figure 4:
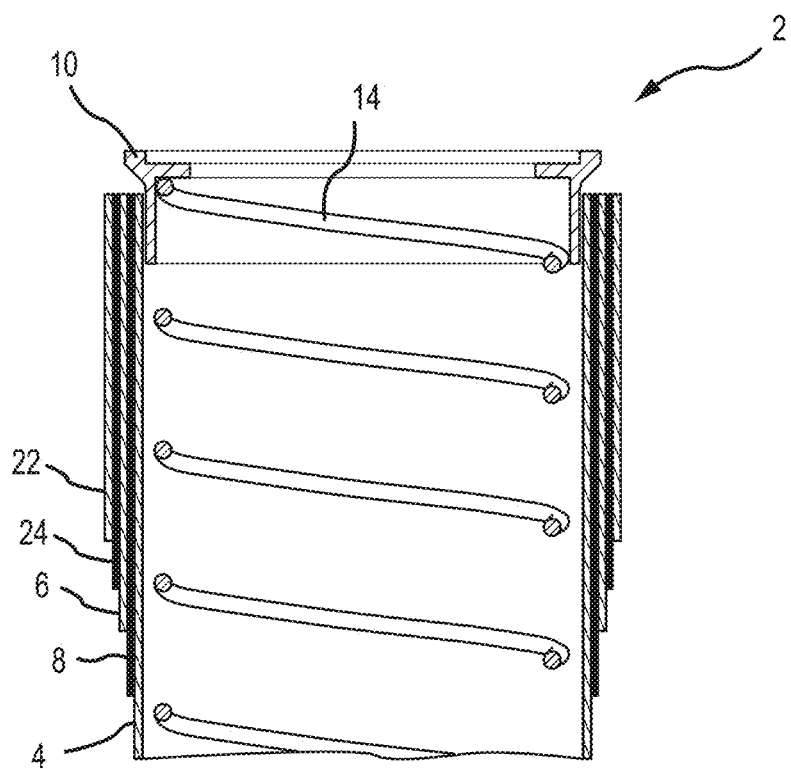
FIG. 4 is a cross-section view of a second embodiment of a multi-ply polymeric duct according to aspects of the present disclosure.

FIG. 4 illustrates an alternative embodiment according to aspects of the present disclosure. Here, a third polymer layer 22 is added to the outside of the duct 2 and a second epoxy layer 24 is positioned between the second polymer layer 6 and the third polymer layer 22. As with the embodiment of FIGS. 1-3, the epoxy layer should fully cover the entirety of the outer surface of the second polymer layer 6 and the inner surface of the third polymer layer 22. According to embodiments of the present invention, the duct 2 may comprise between two to 10 polymer layers with epoxy layers disposed between the adjacent polymer layers.

In a preferred embodiment, the polymer sheets are a film having a thickness between 0.0005 to 0.01 inches. Preferably, the thickness is 0.001 to 0.007 inches. Most preferably the thickness is between 0.003 and 0.005 inches. At these thickness ranges, blow molding or injection molding is difficult. As an alternative to blow molding, ducts can be made by wrapping individual polymer layers or sheets around a mandrel resulting in the finished tube or duct. The ends of each sheet abut or overlap slightly. With reference to FIG. 2, the ends $E_1$ of inner sheet 4 and the ends $E_2$ of outer layer 6 abut in this manner. This results in the polymer layers of the final duct having a single longitudinal seam extending co-axially with the finished duct. This reduces or limits potential areas for leak or separation, for example, compared to helically wound sheets which form a longer seam for a duct of the same axial length. The outer diameter size of the mandrel determines the inner diameter of the final duct.

After the inner most polymer sheet is wound around a mandrel and the edges joined together. According to aspects of the present disclosure, the edges may be bonded through the use of a Kapton or Teflon tape which utilizes the same epoxy used in the construction of the ducts. The tape may be made by applying a layer of epoxy to a thin strip of duct polymer material on the order of 0.5-1.0 inches wide, although the strip of polymer material may be wider. An epoxy layer then is added to the outer surface of the first polymer layer. The epoxy should cover the entirety of the outer surface of the polymer layer. Preferably, the epoxy layer is applied at a thickness of between 0.001 to 0.010 inches, and most preferably is between 0.001 to 0.005 inches in thickness. A second polymer sheet is then applied over the epoxy layer. The second polymer layer 6 also has a single longitudinal seam extending co-axially with the length of the duct. The inner surface 18 of the second polymer layer is pressed onto the underlying epoxy layer 8 to eliminate gaps between the polymer layers and form a continuous bonded construction along the entire length of the duct. As previously noted, additional layers of epoxy and polymer sheets may be added in the same manner. For example, FIG. 3 illustrates the addition of a third polymer layer 22 and second epoxy layer 24. It is believed that a duct made with between 2 and 10 polymer layers will satisfy most end use applications and will provide a duct with an inherent ability to resist occlusion, perforation, and collapse under cryogenic conditions. The continuously bonded structure prevents inclusions of gas and liquid from accumulating if a layer is punctured, and mitigates the risk of occlusion of the duct if flow is allowed to enter the interstitial space between layers. The bonded construction of the invention remains flexible, functional and structurally sound for demonstrated usage to −452 degrees Fahrenheit.

Non-limiting examples of polymer films that may comprise the polymer sheets/layers include but are not limited to Mylar C and D (made by Dupont), Polytetrafluoroethylene (PTFE, made by DuPont), Polychlorotrifluoroethylene (PCTFE/KEL-F, made by MW Kellog and 3M), Flourinated Ethylene Propylene (FEP, made by 3M), Perfluoroalkyl Alkane (PFA), Nomex (made by Dupont), Kapton H (made by Dupont) and other polyimides. Preferably, polymer ply thicknesses are between 0.001-0.005 inches (1-5 mils).

Non-limiting examples of epoxies that may comprise the inter-layers between polymer sheets include but are not limited to EP29LPSP (made by Masterbond), GT-100 (made by G.T. Schjeldahl Company), PR-1578 (made by Martin Company), Kalex D-85 (made by Royal Adhesives and Sealants) and EP21TCHT-1 (made by Masterbond). Preferably, multiple epoxies are blended together to form the final epoxy to be applied. More preferably two epoxies were blended. Most preferably, the optimal epoxy blend was Masterbond EP29LPSP with mixture ratios in the range of 0.0008-0.0011 lbm/ft$^2$ Component A and 0.0005-0.0008 lbm/ft$^2$ Component B applied to each ply of the duct. Alternatively, according to aspects of the present disclosure, in terms of the final epoxy, the epoxy layer density is preferably between 0.001 lbm/ft$^2$ and 0.002 lbm/ft$^2$, and more preferably between 0.00135 and 0.00187 lbm/ft$^2$.

Exemplary ducts according to embodiments of the present disclosure were fabricated for a specific medium pressure cryogenic application as an alternative to an existing airborne metallic ducting system. Testing included exposure to cryogenic fluids while undergoing deflection and external loading representing airborne vehicle requirements when pressurized. Additional testing included high impulse interface separation testing and vibration testing at cryogenic conditions. Testing temperatures ranged between +200 and −450 degrees Fahrenheit. Compared to metal ducting, the testing successfully demonstrated improved flexibility, maintained structural integrity under high impulse and vibration loads known to cause failures in metallic ducting and flex elements, superior fatigue resistance, significantly reduced interface loads due to low mass compared to metallic ducting, efficient flow performance from clean bore design and mitigation concerns for flow induced vibration, and improved damping by multi-ply construction which further reduced interface loads.

Testing was conducted on a duct having 3 polymer layers made of Kapton and epoxy layers made of EP29LPSP. Per ASTM D433 test method, the duct materials withstood impact energy up to 98 joules. The duct was able to withstand stress concentrations resultant from sudden temperature changes without failure. Sudden temperature changes occur when using cryogenic fluids. The duct exhibited an elongation equal to or greater than 2% at −450 degrees Fahrenheit, and a modulus of elasticity of approximately 1 million pounds per square inch (1 Msi) at −450 degrees Centigrade. Testing further established the duct satisfied the outgassing requirements of ASTME-595.

Ducts made according to the present disclosure can withstand dynamic shocks from +200 degrees to −452 degrees Fahrenheit, are compatible with cryogenic propellants including liquid hydrogen (LH2) and liquid oxygen (LO2), and are stable in a vacuum. The following examples illustrate some of the advantages and benefits of particular embodiments according to aspects of the present disclosure. Further advantages and benefits of these embodiments, and other embodiments, will be apparent to those of ordinary skill in the art based on the disclosure herein.

Ducts made according to the present disclosure may be classified as resilient-flexible or flexible per a test method similar to ASTM C1101. More specifically, a 12"×12" section of a final multiply duct, cut longitudinally and laid flat can be bent 90 degrees over a ½" rod without delamination of the plies. Additionally, ducts made according to the present disclosure when subjected to bending and torsion will spring back to their original shape. Testing was conducted at ambient conditions, and at multiple temperatures ranging from −452 degrees Fahrenheit to +30 degrees Fahrenheit. Different ducts with layups containing between 2-10 plies withstood more than 10 successive tests, bending to 180 degrees, without failure. Additionally, a three-foot length of unpressurized 2.5" diameter duct made of three plies was subjected to 10 torsional deflections of 120 degrees about its central axis (0 degrees to 120 degrees clockwise, to 0 degrees, to 120 degrees counterclockwise, to 0 degrees constituting one test cycle) at −452 degrees Fahrenheit, −320 degrees Fahrenheit, and 32 degrees Fahrenheit without collapse, delamination, or rupture.

Multiple ducts according to aspects of the present disclosure were subjected to vibration spectra associated with launch/lift off and flight associated with four different spacecraft locations. The forcing function was applied to one end of a duct (5 and 6 feet long sections were used) while the other end was held static.

| Launch/Lift Off Location No. 1 | |
| --- | --- |
| Frequency (Hz) | Amplitude (g$^2$/Hz) |
| 20 | 1.4 |
| 30 | 15.2 |
| 45 | 15.2 |
| 80 | 1.08 |
| 2000 | 1.08 |
| Overall 50.3 G$_{rms}$ | |

| Launch/Lift Off Location No. 2 | |
| --- | --- |
| Frequency (Hz) | Amplitude (g$^2$/Hz) |
| 20 | 0.8 |
| 30 | 6.4 |
| 40 | 6.4 |
| 60 | 0.8 |
| 175 | 0.8 |
| 200 | 1.6 |
| 300 | 0.03 |
| 600 | 0.03 |
| 2000 | 0.01 |
| Overall 23.74 G$_{rms}$ | |

| Flight Location No. 1 | |
| --- | --- |
| Frequency (Hz) | Amplitude (g$^2$/Hz) |
| 20 | 7.6 |
| 30 | 86 |
| 40 | 86 |
| 55 | 18.8 |
| 320 | 18.8 |
| 450 | 3.2 |
| 1600 | 3.2 |
| 2000 | 0.99 |
| Overall 110.91 G$_{rms}$ | |

| Flight Location No. 2 | |
| --- | --- |
| Frequency (Hz) | Amplitude (g$^2$/Hz) |
| 20 | 1.6 |
| 40 | 1.6 |
| 50 | 0.88 |
| 105 | 0.88 |
| 150 | 6 |
| 220 | 6 |
| 640 | 0.01 |
| 2000 | 0.01 |
| Overall 30.26 G$_{rms}$ | |

Based upon the testing, ducts made according the present disclosure withstand acceleration at least up to approximately 111.0 G$_{rms}$ without failure.

Figure 5:
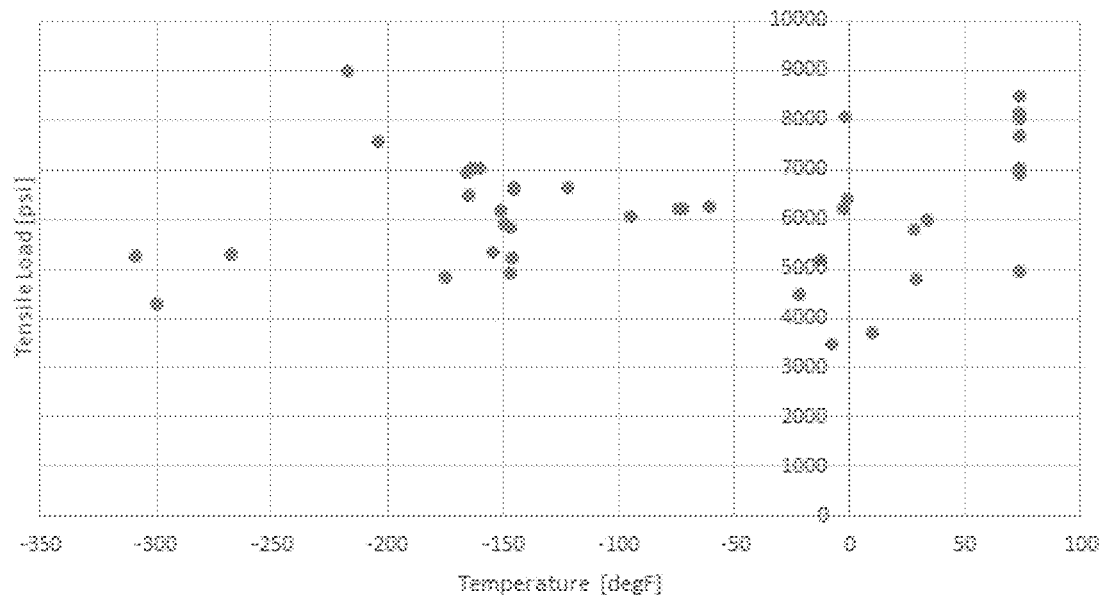
FIG. 5 is a chart of tensile load applied to a multi-ply polymeric duct versus temperature according to aspects of the present disclosure.
Figure 6:
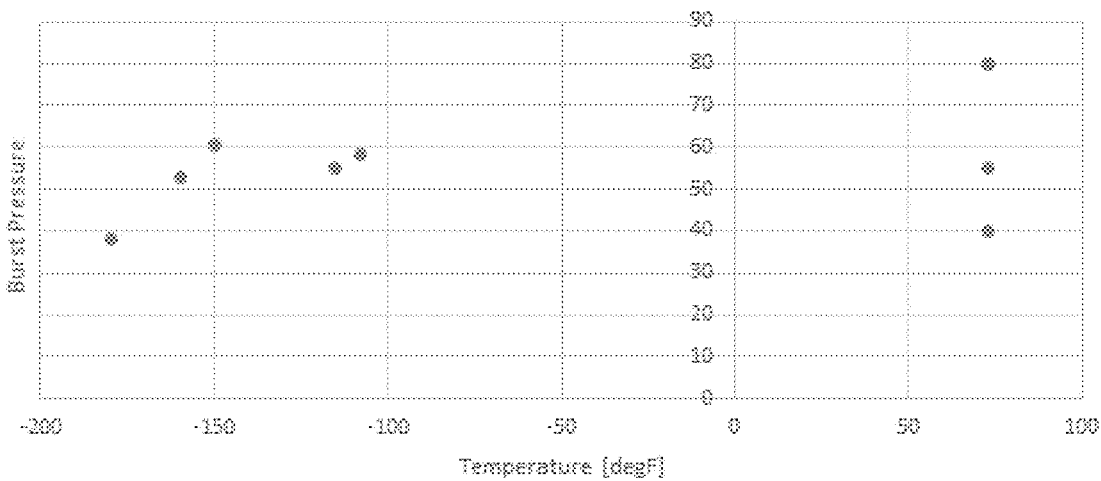
FIG. 6 is a chart of burst pressure applied to a multi-ply polymeric duct versus temperature according to aspects of the present disclosure.

Ducts made according to the present disclosure will also withstand tensile loads applicable during launch/lift off and flight. The first chart shown in FIG. 5 plots tensile load (stretching of a duct along its axis) at a variety of temperatures. This data was generated by a three-ply duct (0.0005" thick Kapton layers) with 0.00136 lbm/ft^2 of epoxy. The second chart shown in FIG. 6 plots burst pressures for a similarly constructed duct. This data does not represent maximum capability of ducts made according to the present disclosure. It is of note that this duct, including end fittings, had a mass of approximately 2.5 lbm, whereas a metallic duct weldment with flexible bellows elements designed for the same interfaces, fluid conditions, and designed to react the same acceleration loads has a mass near 35 lbm. This equates to a decrease in mass and vibration induced interface loads by roughly 93%.

Ducts made according to aspects of the present disclosure also exhibit a significant specific strength over temperatures ranging from ambient to −420 degrees Fahrenheit. Moreover, the specific strength increases as temperatures decrease. Thus, ducts made according to the present disclosure are stronger at cryogenic temperatures than at ambient temperatures. The following table illustrates the increasing specific strength of such ducts with decreasing temperature based upon extrapolated test data.

| Temperature [deg F.] | Min Specific Strength [kip.in/lbm] | Max Specific Strength [kip.in/lbm] |
| --- | --- | --- |
| 70 | 30.0 | 100.0 |
| −260 | 39.8 | 132.6 |
| −300 | 42.5 | 141.6 |
| −320 | 44.6 | 148.6 |
| −420 | 42.3 | 141.0 |

Figure 7:
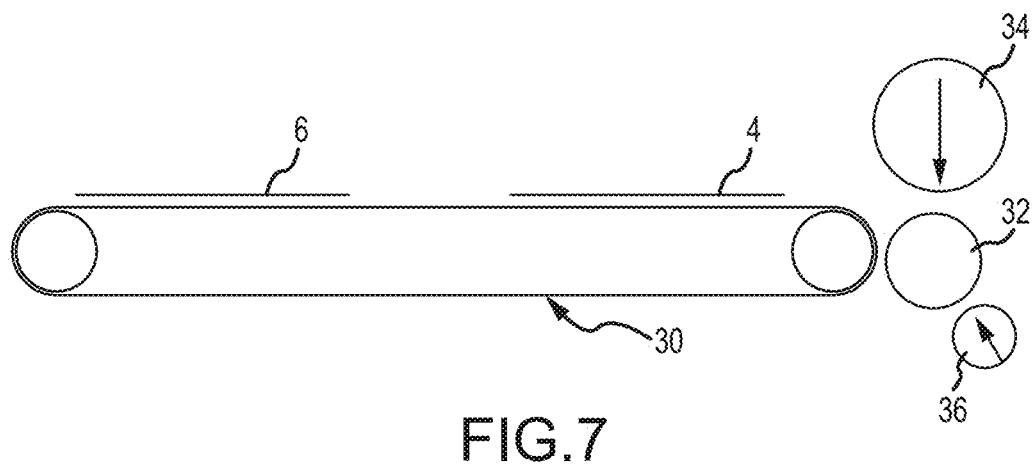
FIG. 7 is a schematic diagram illustrating one method of making ducts according to aspects of the present disclosure.
Figure 8:
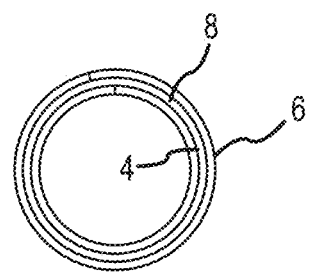
FIG. 8 is an end plan view of the embodiment of FIG. 1.

FIG. 7 illustrates one process for making the cryogenic polymer ducts according to the present disclosure. A conveyor system 26 delivers polymer sheets 4 and 6 to a mandrel 32. A nip roller 34 presses against the mandrel 32 and causes the first polymer sheet to adhere to the mandrel. A vacuum may be applied to the surface of the mandrel to hold the polymer sheet 4 in place. An applicator 36 applies epoxy to the exposed or outer surface of the first polymer sheet 4 to form an epoxy layer 8 on the outer surface. The applicator is biased to engage the polymer sheet and the flow of the epoxy is adjustable for purposes of adjusting the thickness of the applied epoxy layer. The epoxy may be directly applied by a roller or may be sprayed onto the outer surface of the polymer sheet 4. The entirety of the outer surface of the first polymer sheet 4 is covered with epoxy. As illustrated a second polymer sheet 6 is positioned on the conveyor system spaced from the first polymer sheet 4. When the second sheet 6 arrives at the mandrel 32 it is applied over the epoxy layer 8 that was applied by applicator 36 to the outer surface of polymer layer 4 and is pressed into the epoxy layer 8 to ensure full contact between the inner surface of the second polymer sheet 6 and the epoxy layer 8. In this manner, pockets or gaps are removed that could otherwise form between adjacent polymer layers 4 and 6. A gap can become a location for fluid accumulation and ultimately a source of an occlusion of the duct preventing or limiting the flow of gasses. FIG. 8 is an end view of a duct showing two polymer layers 4 and 6 and an inner layer of epoxy 8. Additional layers of polymer sheets and epoxy may be added. The gap between the nip roller 34 and the mandrel is adjustable to accommodate additional layers and to adjust the applied pressure. Following curing or setting of the epoxy, the ends of the duct may be trimmed and the end fittings 10 and 12 attached, with the coiled wire 14 inserted and compressed between the fittings. It will be appreciated by those of skill in the art upon review of the present disclosure that other methods exist for making the ducts of this nature and such methods are within the scope of the present disclosure.

Furthermore, embodiments of the present disclosure eliminate the possibility of a galvanic couple forming between the end fitting metallic elements, and is a continuous as opposed to helically wound construction of a single walled duct comprised of multiple layers with a greater flexibility and smaller effective bend radius than multi-walled ducts, insulated ducts, and metallic ducts. The ducts are also capable of being made with metallicized film, which in addition to the internal spring in one embodiment, provides a grounding path for electric current between the end fittings.

Another structural distinction of embodiments made according to the present disclosure is the usage of an internal coiled wire to provide form and resiliency to the duct while minimizing the transmission of loads. Preferably, the internal wire is passively captured at its ends, rather than bonded or welded to the duct, allowing the structure of the duct to freely move when subjected to launch vehicle vibration while distributing loads to the end fittings. A duct with cable reinforcement or a spring bonded to its pressure barrier would be unable to do this without failure of the pressure barrier. Additionally, the internal reinforcement aids in the prevention of occlusion or collapse in the event of perforation, puncture, or crushing of the duct, whereas interstitial or external reinforcement approaches rely on adherence to prevent collapse. Alternatively, the wire may be located on the exterior of the duct to provide structural support and impact resistance or a wire may be provided both on the interior and exterior of the duct.

The various embodiments of methods, devices, and systems used to interconnect or join two components under large forces and possible shocks have been described herein in detail. Such interconnection or joint systems and devices are capable of being designed and constructed using other methods and of being practiced or of being carried out in various ways as will be readily understood by those of skill in the art upon review of the present disclosure. Such modifications and alterations of those embodiments as will occur to those skilled in the art upon review of the present disclosure are within the scope and spirit of the claimed invention, as set forth in the following claims. In addition, it is to be understood that the phraseology and terminology used herein is for the purpose of description and should not be regarded as limiting.

Although many of the figures show components of a spacecraft, the present invention is not limited to spacecraft. Embodiments of the present invention can, for example, be used with pipes, aircraft, terrestrial vehicles such as watercraft and land vehicles, inground or aboveground storage tanks, or any other situations where two components are interconnected together and the interconnection experiences large forces or high pressures, regardless of whether the component pieces are to remain connected or are to be separable.

This design is adaptable to different performance requirements and operating fluids by adjusting the number and thickness of plies, the type and application of epoxy, and style of plastic or metallic wire reinforcement. This composite construction is made possible through a unique manufacturing process. In one embodiment, the process controls ply layup, adhesive application, and intermediate curing steps on a precision mandrel.

Embodiments of the present disclosure may be used in the aerospace and aircraft industries, cryogenic fluid plants, electronic cooling systems, semi-conductor fabrication, cryogenic machining and material treatment/fabrication, super conducting electronics (cryotronics), high altitude balloons, nuclear reactors, particle accelerators, telescopes and high precision optics, and any other application involving cryogenic conditions.

What is claimed is:

1. A duct for transporting cryogenic fluids, comprising:
    a first polymer tubular member defining a first open end and an opposing second open end with a single seam extending between the first end and the second end and oriented substantially parallel to a longitudinal axis of the first polymer tubular member, the first polymer tubular member having an inner surface and an outer surface and a thickness between approximately 0.0005 and 0.01 inches;
    a first epoxy layer covering the entirety of the outer surface of the first polymer tubular member, the first epoxy layer having at least one of a thickness of between 0.001 and 0.005 inches and a density of between 0.001 lbm/ft$^2$ and 0.002 lbm/ft$^2$;
    a second polymer tubular member defining a first open end and a second open end with a single seam extending between the first end and the second end and oriented substantially parallel to the longitudinal axis of the first polymer tubular member, the second polymer tubular member having an inner surface and an outer surface and a thickness between approximately 0.0005 and 0.0100 inches, and the second polymer tubular member covering the first epoxy layer such that a continuous bond is formed between the inner surface of the second polymer tubular member and the first epoxy layer with the first open end of the second polymer tubular member aligned with the first open end of the first polymer tubular member to define a first common open end and the second open end of the second polymer tubular member aligned with the second open end of the first polymer tubular member to define a second common open end;
- a first annular fitting interconnected to the first common open end of the combined first and second polymer tubular members;
- a second annular fitting interconnected to the second common open end of the combined polymer tubular members; and
- a coiled wire having a first end in contact with the first annular fitting and a second end in contact with the second annular fitting.

2. The duct of claim 1, wherein the thickness of the first epoxy layer is between 0.0012 lbm/ft$^2$ and 0.00195 lbm/ft$^2$.

3. The duct of claim 1, further comprising:
- a second epoxy layer covering the entirety of the outer surface of the second polymer tubular member, the second epoxy layer having a thickness of between 0.001 and 0.005 inches;
- a third polymer tubular member defining a first open end and a second open end with a single seam extending between the first end and the second end and oriented substantially parallel to the longitudinal axis of the first polymer tubular member, the third polymer tubular member having an inner surface and an outer surface and a thickness between approximately 0.0005 and 0.01 inches, and the third polymer tubular member covering the second epoxy layer such that a continuous bond is formed between the inner surface of the third polymer tubular member and the second epoxy layer with the first open end of the third polymer tubular member aligned with the first open ends of the first and second polymer tubular members to further define the first common open end and the second open end of the third polymer tubular member aligned with the second open ends of the first and second polymer tubular members to further define the second common open end.

4. The duct of claim 2, further comprising an additional polymer tubular member that covers the outer surface of the second polymer tubular member and has a thickness between approximately 0.0005 and 0.01 inches, and wherein an additional epoxy layer is applied between the second and additional polymer tubular members such that a continuous bond is formed between the second and additional polymer tubular members and the additional epoxy layer has at least one of a thickness of approximately between 0.001 and 0.005 inches and a density of between approximately 0.001 lbm/ft$^2$ and 0.002 lbm/ft$^2$.

5. The cryogenic composite duct of claim 1, wherein the spring is configured to contact each of the first fitting and the second fitting to provide an electric ground path between the first fitting and the second fitting.

6. The cryogenic composite duct of claim 1, wherein the spring has an uncompressed length that is larger than a length of the combined polymer sheets such that the spring is configured to contact the first fitting and the second fitting.

7. The cryogenic composite duct of claim 1, wherein the first polymer sheet comprises one of 4,4'-oxydiphenylene-pyromellitimide, polytetrafluoroethylene, and fluorinated ethylene propylene.

8. The cryogenic composite duct of claim 1, wherein a specific strength of the duct increases as the temperature of the duct decreases.

9. The cryogenic composite duct of claim 1, wherein the duct has a specific strength between approximately 30 and 150 kip*in/lbm.

10. A cryogenic composite duct, comprising:
- a first polymer sheet having a first edge and a second edge joined to form a tubular shape with the first and second edges forming a longitudinal seam oriented substantially parallel to an axis of the tubular shape;
- a first epoxy layer applied on an outer surface of the first polymer sheet, the first epoxy layer having a first component and a second component;
- a second polymer sheet applied on the first epoxy layer such that the second polymer sheet forms a continuous bond with the first epoxy layer and the first polymer sheet to form combined polymer sheets having a tubular shape with a first opening and an opposing second opening;
- a first fitting interconnected to the first opening of the combined polymer sheets;
- a second fitting interconnected to the second opening of the combined polymer sheets; and
- a spring positioned within the combined polymer sheets between the first fitting and the second fitting, wherein the spring has an uncompressed length that is larger than a length of the combined polymer sheets such that the spring is configured to contact the first fitting and the second fitting.

11. The cryogenic composite duct of claim 10, wherein the first polymer sheet has a thickness between approximately 0.0005 and 0.01 inches, and the second polymer sheet has a thickness between approximately 0.0005 and 0.01 inches.

12. The cryogenic composite duct of claim 10, wherein the first epoxy has at least one of a thickness of approximately between 0.001 and 0.005 inches and a density of between approximately 0.001 lbm/ft$^2$ and 0.002 lbm/ft$^2$.

13. The cryogenic composite duct of claim 10, further comprising:
- a second epoxy layer applied on an outer surface of the second polymer sheet, the second epoxy layer having at least one of a thickness of between 0.001 and 0.005 inches and a density of between 0.001 lbm/ft$^2$ and 0.002 lbm/ft$^2$; and
- a third polymer sheet applied on the second epoxy layer such that the third polymer sheet forms a continuous bond with the second epoxy layer, the second polymer sheet, the first epoxy layer, and the first polymer sheet to form the combined polymer sheets, the third polymer sheet having a thickness between approximately 0.0005 and 0.0100 inches.

14. The cryogenic composite duct of claim 10, wherein the first polymer sheet comprises one of 4,4'-oxydiphenylene-pyromellitimide, polytetrafluoroethylene, and fluorinated ethylene propylene.

15. The cryogenic composite duct of claim 10, wherein the duct has a specific strength between approximately 30 and 150 kip*in/lbm.

16. A method for passing a cryogenic fluid through a cryogenic composite duct, comprising:
- providing a cryogenic composite duct having:
  - a tubular member comprising:
    - a first polymer sheet having a first edge and a second edge joined to form a longitudinal seam oriented substantially parallel to an axis of the tubular member, the first polymer sheet having a thickness between approximately 0.0005 and 0.01 inches;

a first epoxy layer applied on an outer surface of the first polymer sheet, the first epoxy layer having at least one of a thickness of between 0.001 and 0.005 inches and a density of between 0.001 lbm/ft$^2$ and 0.002 lbm/ft$^2$; and a second polymer sheet applied on the first epoxy layer such that the second polymer sheet forms a continuous bond with the first epoxy layer and the first polymer sheet to form combined polymer sheets having a tubular shape with a first opening and an opposing second opening, the second polymer sheet having a thickness between approximately 0.0005 and 0.01 inches;

a first fitting interconnected to the first opening of the combined polymer sheets;

a second fitting interconnected to the second opening of the combined polymer sheets;

a spring positioned within the combined polymer sheets between the first fitting and the second fitting; and passing a cryogenic fluid through the first fitting, the tubular member, and the second fitting, the cryogenic fluid having a temperature less than −259 degrees Fahrenheit.

17. The method of claim 16, wherein the temperature of the cryogenic fluid is less than −424 degrees Fahrenheit.

18. The method of claim 16, wherein the first polymer sheet comprises one of 4,4'-oxydiphenylene-pyromellitimide, polytetrafluoroethylene, and fluorinated ethylene propylene, and the cryogenic fluid is liquid oxygen.

19. The method of claim 16, wherein the second polymer sheet is biaxially-oriented polyethylene terephthalate, and the cryogenic fluid is one of liquid kerosene, liquid hydrogen, liquid hydrogen peroxide, and liquid methane.

20. The method of claim 16, wherein the spring has an uncompressed length that is larger than a length of the combined polymer sheets such that the spring is configured to contact the first fitting and the second fitting.

21. The method of claim 16, wherein the cryogenic composite duct further comprises:

a second epoxy layer applied on an outer surface of the second polymer sheet, the second epoxy layer having at least one of a thickness of between 0.001 and 0.005 inches and a density of between 0.001 lbm/ft$^2$ and 0.002 lbm/ft$^2$; and a third polymer sheet applied on the second epoxy layer such that the third polymer sheet forms a continuous bond with the second epoxy layer, the second polymer sheet, the first epoxy layer and the first polymer sheet to form the combined polymer sheets, the third polymer sheet having a thickness between approximately 0.0005 and 0.01 inches.

\* \* \* \* \*